(12) United States Patent
Farrar et al.

(10) Patent No.: US 7,170,196 B2
(45) Date of Patent: Jan. 30, 2007

(54) POWER FEED

(75) Inventors: Tony Farrar, Bexley (GB); Simon Timothy Perry, Plumstead (GB)

(73) Assignee: Alcatel, Paris (FR)

( * ) Notice: Subject to any disclaimer, the term of this patent is extended or adjusted under 35 U.S.C. 154(b) by 391 days.

(21) Appl. No.: 10/411,126

(22) Filed: Apr. 11, 2003

(65) Prior Publication Data

US 2003/0231516 A1 Dec. 18, 2003

(30) Foreign Application Priority Data

Apr. 12, 2002 (GB) ................... 0208485.3

(51) Int. Cl.
*H02J 3/00* (2006.01)
*H04B 13/02* (2006.01)
(52) U.S. Cl. .......................... 307/46; 307/44
(58) Field of Classification Search .................. 307/44, 307/69, 31, 38, 71, 80, 82
See application file for complete search history.

(56) References Cited

U.S. PATENT DOCUMENTS 3,818,307 A * 6/1974 Hamilton et al. ............. 363/25
4,270,165 A * 5/1981 Carpenter et al. ............ 363/65
5,629,844 A * 5/1997 Krichtafovitch et al. ...... 363/65
5,719,693 A 2/1998 Tanoue ....................... 359/174

FOREIGN PATENT DOCUMENTS

EP 0989717 A2 3/2000

* cited by examiner

*Primary Examiner*—Brian Sircus
*Assistant Examiner*—Hal I. Kaplan
(74) *Attorney, Agent, or Firm*—Sughrue Mion, PLLC

(57) ABSTRACT

An electrical power feed for a submarine system and a method of supplying electrical power to the submarine system in which a plurality of power converters are used for feeding electrical power into the submarine system. A plurality of control circuits are each connected to at least one of the power converters and control the level of power output by the respective power converter(s) to which it is connected. Each power converter is connected to only one control circuit and at least some of the power converters operate independently from each other.

13 Claims, 1 Drawing Sheet

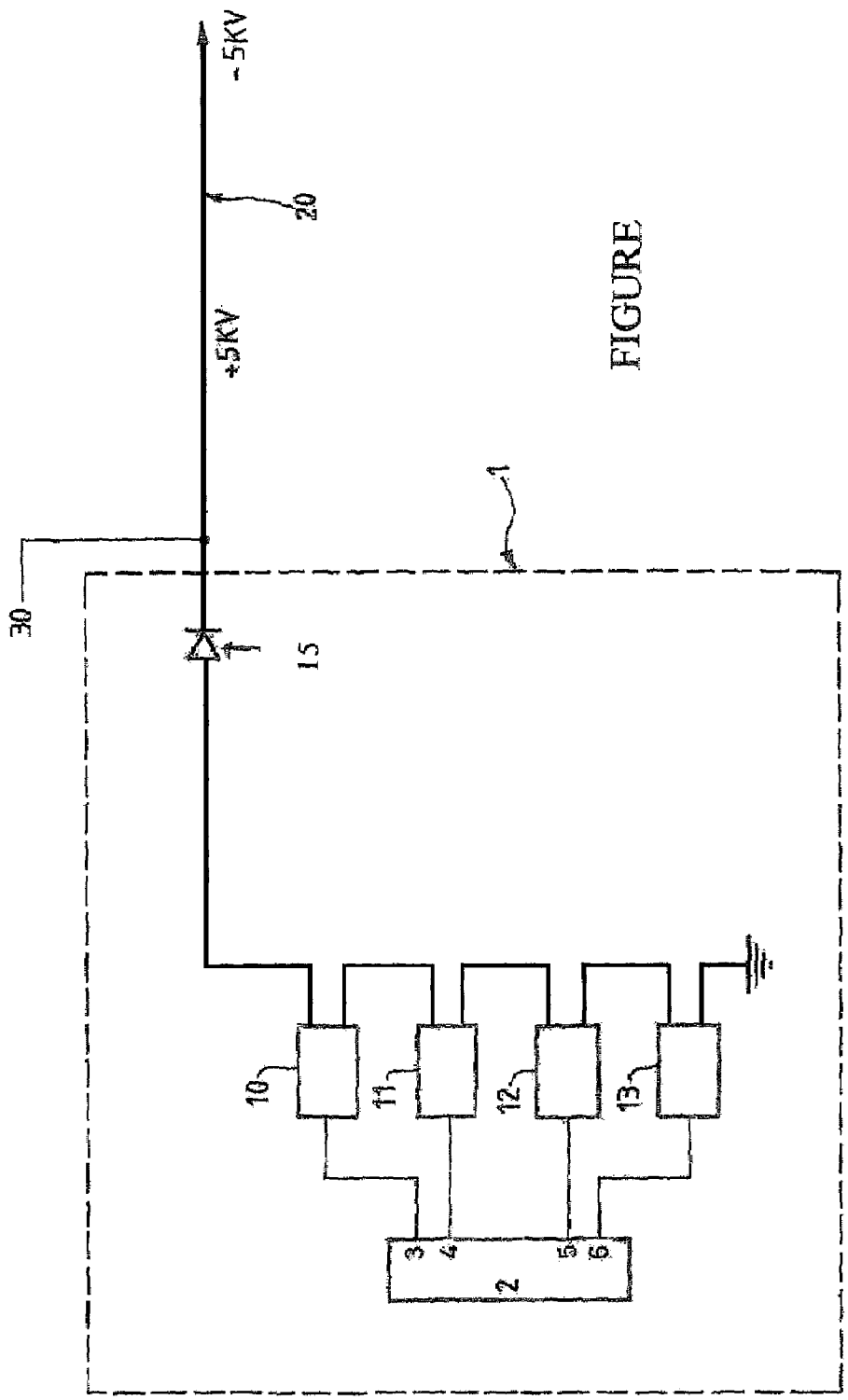

POWER FEED

BACKGROUND OF THE INVENTION

This invention relates to a power feed for feeding electrical power into a submarine system, e.g. a submarine power cable for supplying power to repeaters on a submarine fibre optic. It is envisaged that it will be particularly useful in dual-end power feeding systems in which the submarine system traverses a body of water (e.g. the Atlantic) between two countries e.g. the UK and the US, and a power feed is provided in each country such that the submarine system receives power from both ends.

In a conventional prior art dual-end power feeding submarine system, a submarine cable traverses a body of water between two land based power feeds. The cable is run so that it has a potential difference of 10 kV between its ends. It receives a potential of +5 kV at its first end and −5 kV at its second end from the respective power feeds. The cable is at zero potential (virtual earth) at a point near the middle. The electrical power is used to drive repeaters which are spaced along the cable and which are used to regenerate signals in a fibre optic cable running generally inside of the cable.

The power feed includes a controller and electrical power converters. The power converters receive electrical power from a power source in the country in which the power feed is located, usually this will be 50 VDC Telecom derived from A.C. electricity from the countrys' national grid or possibly from a diesel generator. Each converter converts the electrical power which it receives from the local power source into a regulated D.C. signal which it feeds into the power cable.

The characteristics of the D.C. signal output by each power converter, and in particular the output D.C. voltage, is determined by the controller which is connected to each of the power converters. The controller outputs the same control signal to each of the power converters; generally the power converters are controlled by pulse width modulation and the controller is a pulse width modulator.

Generally each power converter operates at maximum efficiency when it is outputting at its maximum output power. In a typical example each power converter is able to output between 0 and 3 kW. The output voltage depends upon the pulse width modulation signal which the power converter receives.

Under ordinary conditions half of the requisite power for operating the submarine system is provided by the first power feed and half of the requisite power is provided by the second power feed. The split need not be exactly 50:50, for example the first power feed could provide 60% and the second power feed 40% of the required power. However in the above example under ordinary conditions 5 kV at 1 A (i.e. 5 kW) is provided by each power feed. This means that under fault conditions when one of the power feeds is out of operation, the remaining power feed must provide all of the requisite power for running the submarine system, i.e. double the power which it supplies under normal operating conditions. Thus each power converter in the power feed is operated at half power providing an output voltage of 1.25 kV under normal conditions providing a total output voltage of 5 kV. Under fault conditions each power converter is run at 2.5 kW (the maximum power) providing a total output voltage of 10 kV at 1 A.

A problem with the above described conventional power feed is that under normal operating conditions each power converter is operated at partial load which is less than the maximum operating efficiency. This wastes energy and also causes the converters to run at a higher temperature than necessary. An object of the current invention is to ameliorate this problem and provide a power feed which operates at greater efficiency.

SUMMARY OF THE INVENTION

Accordingly a first aspect of the present invention provides an electrical power feed for a submarine system, including a plurality of power converters for feeding electrical power into the submarine system, and a plurality of controllers each connected to at least one of the power converters and controlling the level of power output by the power converter(s) to which it is connected, each power converter being connected to only one controller.

In this way, at least some of the power converters are independent of the other power converters. Thus some of the power converters may be run at maximum efficiency (usually maximum output power) while other power converters can be run at less than maximum power (e.g. partial load). In this way the efficiency of the power feed under normal operating conditions is enhanced and under fault conditions it is possible to make up the shortfall by increasing the power output by the power converters which are run at less than maximum power under normal conditions.

Preferably each controller is connected to only one power converter so that each respective power converter is controlled by a respective controller. This allows maximum flexibility in controlling the power output by each power converter as each power converter is then controlled independently.

The controller may be any suitable controller able to control the output power of a power converter. Preferably each controller is a pulse width modulator (PWM).

In some embodiments, some or all of the controllers may be part of a single controller, e.g., each controller may be an independent PWM output of the controller, operable independently of the other PWM outputs.

The number of power converters will depend upon the required total output power and the maximum output power of each converter. Prior art power feeds generally have between one and six power converters. It is envisaged that power feeds according to the current invention will generally have between two and six power converters, and possibly up to eleven power converters.

The power feed may have as many controllers as there are power converters. Preferably there will be at least three controllers. Where each controller is connected to only one power converter, there will be as many controllers as there are power converters.

Preferably the plurality of power converters includes a first set of power converters and a second set of power converters and the power feed is capable of switching between a first operating condition and a second operating condition. In the first operating condition power converters in the first set are controlled to operate at maximum efficiency while power converters in the second set are controlled to give less than maximum power output. In the second operating condition the power converters in the first set are controlled to operate at maximum efficiency and the power converters in the second set are controlled to give a higher power output than they give in the first operating condition.

This gives a high level of efficiency under normal operating conditions and enables extra power to be supplied if necessary.

Preferably in the first and second operating conditions the power converters in the first set are controlled to give maximum power output. Most power converters operate at maximum efficiency at or near maximum power output.

Preferably in the second operating condition power converters in the second set are controlled to give maximum power output. This ensures that in the second operating condition the power feed is outputting maximum power and is also operating at a high level of efficiency.

Preferably in the first operating condition all but one of the power converters is controlled to run at maximum operating efficiency.

According to a second aspect of the present invention there is provided a method of supplying electrical power to a submarine system including the steps of:— a) providing a power feed having a plurality of power converters for feeding electrical power into the submarine system and a plurality of controllers, each controller being connected to at least one of the power converters, each power converter being connected to only one controller;

b) using at least some of the power converters in said plurality to feed electrical power into the submarine system; and c) using each respective controller to control the level of power output by the power converter(s) to which it is connected.

The power feed can have any of the preferred characteristics of a power feed according to the first aspect of the invention. Further preferred features can be found in the claims.

BRIEF DESCRIPTION OF THE DRAWINGS

An embodiment of the present invention will now be described with reference to the accompanying drawings in which the sole FIGURE is a dual-end feeding submarine system according to an embodiment of the present invention.

DETAILED DESCRIPTION OF THE INVENTION

In one embodiment, a power feed 1 shown in the FIGURE has a controller 2. The controller 2 is a pulse width modulator with four independent PWM outputs 3, 4, 5 and 6 which are connected to four power converters 10, 11, 12 and 13 respectively.

In this example, each of the power converters 10, 11, 12 and 13 are 3 kW converters; i.e. their maximum output power is 3 kW, which is usually delivered at 3 kV and 1 amp.

In this example, the power feed 1 is connected to one end of a submarine cable 20. The other end of the submarine cable 20 may be connected to a further power feed (not shown). As has been described previously, under normal operating conditions the power feed 1 may be set up to supply, for example, +5 kV and the other power feed (not shown) may provide −5 kV, giving a total voltage differential along the submarine cable of +10 kV.

In some embodiments, a further power feed (similar to or identical to power feed 1) may be connected at point 30 shown in the Figure, i.e. downstream of an output rectifier 15 of the power feed 1 and in parallel with power feed 1. This arrangement provides some redundancy in the system and therefore greater reliability. The same arrangement may be repeated at the opposite end of the submarine cable.

In a first operating condition the controller 2 controls power converter 10 to have an output of 3 kV. The power converters operate at maximum efficiency when they are outputting 3 kV which is their maximum output voltage. Meanwhile the controller 2 controls power converter 11 to output 2 kV, and power converters 12 and 13 to output substantially nothing. Thus the total voltage output by the power feed 1 when in the first operating condition, is +5 kV. The first operating condition is used under normal operating conditions when an output of +5 kV is required.

Power feed 1 has a second operating condition in which the controller controls the converters 10, 11 and 12 to output 3 kV each, and in which power converter 13 outputs 1 kV so that the total voltage output by the power feed is +10 kV. The second operating condition is used when, for whatever reason, a greater power output is required. For example, under fault conditions in a dual-end power feeding system, a power feed such as that shown in the FIGURE can be put into the second operating condition so that the total voltage across the system is kept at 10 kV.

In alternative embodiments the first and second operating conditions may differ from the above so that different output voltages can be achieved, preferably while still maintaining optimum efficiency for a particular voltage. Furthermore there may be more than two operating conditions.

In a typical power feed system, there is a closed feedback back loop to control the controller 2. In other words, the controller 2 monitors the output power of the power feed 1 and adjusts the operation of the power converters as necessary. In some embodiments of the present invention, a further control function is added. If the overall efficiency of the power feed (i.e. pulse width of the signal applied to the converter) is less than a chosen value (e.g. 90%), then one (and if necessary, more than one) of the power converters are shut down until the overall efficiency (i.e. pulse width) becomes greater than a second chosen level (e.g. 95%), at which time when the additional control function is removed and the system remains under the control of the standard closed feedback loop.

While the invention has been described with reference to two specific examples, it is not limited thereto and as will be appreciated by a person skilled in the art various variations and modifications can be made whilst still remaining within the scope of the appended claims.

The invention claimed is:

1. An electrical power feed for a submarine system having two ends each of which receives power from a respective electrical power feed system, comprising:

a plurality of power converters for feeding electrical power into the submarine system; and a plurality of control means, each control means being connected to at least one of the power converters and controlling the level of power output by the power converter(s) to which it is connected, each power converter being connected to only one control means;

wherein said control means control said power converters at least in part in dependence on an operating state of the electrical power feed system at the other end of said submarine system.

2. The electrical power feed of claim 1 wherein each control means is connected to only one power converter such that each respective power converter in said plurality of power converters is controlled by a respective control means.

3. The electrical power feed of claim 1 wherein each control means is a pulse width modulator.

4. An electrical power feed for a submarine system, comprising:

a plurality of power converters for feeding electrical power into the submarine system; and a plurality of control means, each control means being connected to at least one of the power converters and controlling the level of power output by the power converter(s) to which it is connected, each power converter being connected to only one control means;

wherein the plurality of power converters includes a first set of power converters and a second set of power converters and wherein the power feed is capable of switching between a first operating condition and a second operating condition, in the first operating condition power converters in the first set are controlled to operate substantially at their maximum efficiencies while power converters in the second set are controlled to give less than their maximum power outputs, in the second operating condition the power converters in the first set are controlled to operate substantially at their maximum efficiencies and the power converters in the second set are controlled to give a higher power output than they give in the first operating condition.

5. The electrical power feed of claim 4 wherein in the first and second operating conditions the power converters in the first set are controlled to give maximum power output.

6. The electrical power feed of claim 4 wherein in the second operating condition power converters in the second set are controlled to give maximum power output.

7. The electrical power feed of claim 4 adapted for use as a power feed for feeding electrical power into one end of a submarine system having two ends both of which take power from a respective power feed, wherein the first operating condition of the power feed is configured to feed into the submarine system a predetermined voltage for use in normal conditions and the second operating condition of the power feed is configured to feed into the submarine system a predetermined voltage sufficient to operate the system when the power feed at the other end of the submarine system is out of operation.

8. A method of supplying electrical power to a submarine system having two ends each of which receives power from a respective electrical power feed system, said method including the steps of:
  a) providing a power feed having a plurality of power converters for feeding electrical power into the submarine system and a plurality of control means, each control means being connected to at least one of the power converters, each power converter being connected to only one control means;
  b) using at least some of the power converters in said plurality to feed electrical power into the submarine system; and
  c) using each respective control means to control the level of power output by the power converter(s) to which it is connected,
  wherein said control means control said power converters at least in part in dependence on an operating state of the electrical power feed system at the other end of said submarine system.

9. A method according to claim 8 wherein each control means is connected to only one power converter such that each respective power converter in said plurality of power converters is controlled by a respective control means.

10. A method according to claim 8 wherein each power converter is a pulse width modulator.

11. A method of supplying electrical power to a submarine system including the steps of:
  a) providing a power feed having a plurality of power converters for feeding electrical power into the submarine system and a plurality of control means, each control means being connected to at least one of the power converters, each power converter being connected to only one control means;
  b) using at least some of the power converters in said plurality to feed electrical power into the submarine system; and
  c) using each respective control means to control the level of power output by the power converter(s) to which it is connected,
  wherein the plurality of power converters includes a first set of power converters and a second set of power converters and wherein the power feed is capable of switching between a first operating condition and a second operating condition and wherein step c involves:
  controlling the power converters in the first set to operate substantially at their maximum efficiencies and the power converters in the second set to give less than their maximum power outputs when the power feed is in its first operating condition; and
  controlling the power converters in the first set to operate substantially at their maximum efficiencies and the power converters in the second set to give a higher output than in the first operating condition when the power feed is in its second operating condition.

12. A method according to claim 11 wherein in the first and second operating conditions the power converters in the first set are controlled to give maximum power output.

13. A method of feeding electrical power into one end of a submarine system having at least two ends both of which take power from a respective power feed, the method being in accordance with claim 12 and further including the step of determining whether the power feed at an other end of the submarine system is operational or not and using the first operating condition if said power feed at the other end is operational and the second operating condition if said power feed at the other end is out of operation.

* * * * *